US010093816B2

(12) United States Patent
Chen et al.

(10) Patent No.: US 10,093,816 B2
(45) Date of Patent: Oct. 9, 2018

(54) HIGH FIXATION INK COMPOSITION FOR DIGITAL TEXTILE PRINTING

(71) Applicant: Everlight Chemical Industrial Corporation, Taipei (TW)

(72) Inventors: Hsiao-San Chen, Taoyuan (TW); Chuan-Hsi Lee, Taoyuan (TW); Chien-Yu Chen, Taoyuan (TW); Tz-Yi Wu, Taoyuan (TW); Hsuan Yang, Taoyuan (TW)

(73) Assignee: EVERLIGHT CHEMICAL INDUSTRIAL CORPORATION, Taipei (TW)

( * ) Notice: Subject to any disclaimer, the term of this patent is extended or adjusted under 35 U.S.C. 154(b) by 152 days.

(21) Appl. No.: 15/138,252

(22) Filed: Apr. 26, 2016

(65) Prior Publication Data
US 2016/0326384 A1 Nov. 10, 2016

(30) Foreign Application Priority Data

May 8, 2015 (TW) .................................. 104114695

(51) Int. Cl.

| | | |
|---|---|---|
| *C09D 11/328* | (2014.01) | |
| *C09D 11/38* | (2014.01) | |
| *C09D 11/03* | (2014.01) | |
| *C09B 62/06* | (2006.01) | |
| *C09B 62/085* | (2006.01) | |
| *C09B 62/09* | (2006.01) | |
| *D06P 1/382* | (2006.01) | |
| *D06P 5/30* | (2006.01) | |
| *C09D 5/14* | (2006.01) | |
| *C09B 62/04* | (2006.01) | |

(52) U.S. Cl.
CPC ............ *C09D 11/03* (2013.01); *C09B 62/043* (2013.01); *C09B 62/046* (2013.01); *C09B 62/06* (2013.01); *C09B 62/085* (2013.01); *C09B 62/09* (2013.01); *C09D 5/14* (2013.01); *C09D 11/328* (2013.01); *C09D 11/38* (2013.01); *D06P 5/30* (2013.01); *D06P 1/382* (2013.01)

(58) Field of Classification Search
CPC ....... C09D 11/328; C09D 11/38; C09D 11/03; C09B 62/043; C09B 62/046; C09B 62/06; C09B 62/085; C09B 62/09; D06P 1/382; D06P 5/30
USPC ........... 106/31.47, 31.48, 31.49, 31.5, 31.58, 106/31.44
See application file for complete search history.

(56) References Cited

U.S. PATENT DOCUMENTS

| | | | | | |
|---|---|---|---|---|---|
| 3,926,942 | A | * | 12/1975 | Yelland ............... | C09B 62/4407 534/618 |
| 5,149,789 | A | * | 9/1992 | Jessen .................. | C09B 62/043 534/618 |
| 5,358,558 | A | * | 10/1994 | Yamamoto ................ | B41J 2/01 106/31.47 |
| 5,584,918 | A | * | 12/1996 | Suzuki ................ | D06P 1/67366 106/31.47 |
| 5,629,409 | A | | 5/1997 | Löffler et al. | |
| 5,972,084 | A | * | 10/1999 | Lacroix ..................... | D06P 5/30 106/31.36 |
| 6,310,187 | B1 | * | 10/2001 | Oh ...................... | C09B 62/4413 534/638 |
| 6,359,121 | B1 | * | 3/2002 | Ebenezer .............. | C09B 62/043 534/605 |
| 6,500,247 | B1 | * | 12/2002 | Lehmann ................ | C09B 43/16 106/31.48 |
| 6,780,229 | B2 | | 8/2004 | Hopper et al. | |
| 7,052,521 | B2 | * | 5/2006 | Huang .................. | C09B 62/085 8/549 |
| 7,683,208 | B2 | * | 3/2010 | Chen ..................... | C07C 317/36 562/67 |
| 7,967,903 | B2 | * | 6/2011 | Lee ...................... | C09D 11/328 106/31.47 |
| 2004/0081761 | A1 | * | 4/2004 | Tyvoll ................... | D06P 1/6426 427/304 |
| 2011/0015378 | A1 | * | 1/2011 | Chen ........................ | C09B 7/00 534/624 |
| 2014/0157530 | A1 | * | 6/2014 | Murai ................... | C09D 11/30 8/549 |

FOREIGN PATENT DOCUMENTS

| | | |
|---|---|---|
| CN | 101519551 A | 9/2009 |
| CN | 102926224 A | 2/2013 |
| DE | 2349709 A1 | 4/1974 |
| DE | 2611550 A1 | 9/1976 |
| DE | 4305453 A1 | 8/1994 |
| EP | 0391264 A1 | 10/1990 |

(Continued)

OTHER PUBLICATIONS

European Search Report for EP 3091056, dated Aug. 17, 2016; 4 pages.*
European Written Opinion for EP 3091056, dated Aug. 17, 2016; 3 pages.*
English translation of the Chinese First Office Action for CN 106120388, dated Nov. 15, 2017; 7 pages.*
Japanese Reasons for Refusal for JP 2017/014483, dated May 2, 2017; 3 pages.*

(Continued)

*Primary Examiner* — Helene Klemanski
(74) *Attorney, Agent, or Firm* — Bacon & Thomas, PLLC

(57) ABSTRACT

The present invention is related to a novel high fixation ink composition for digital textile printing, which comprises: (A) at least one reactive dye compound with two reactive groups in an amount of 1% to 50% by weight; (B) an organic buffer in an amount of 0.05% to 10% by weight; (C) a humectant in an amount of 10% to 50% by weight; and (D) a solvent in remaining amount. When the aforesaid ink composition is applied in digital textile printing, fixation rate of dye on fabrics is high.

7 Claims, No Drawings

(56) References Cited

FOREIGN PATENT DOCUMENTS

| EP | 0606777 A2 | 7/1994 |
|---|---|---|
| JP | 9268482 A | 10/1997 |
| JP | 2002522587 A | 7/2002 |
| JP | 2002536487 A | 10/2002 |
| JP | 2004143462 A | 5/2004 |
| JP | 2005/047990 * | 2/2005 |
| JP | 2005047990 A | 2/2005 |
| TW | 201102411 A | 1/2011 |
| WO | 2007/077129 A2 | 7/2007 |

OTHER PUBLICATIONS

Reactive Blue 160 structure; http://www.worlddyevariety.com/reactive-dyes/reactive-blue-160.html; no date available; 6 pages.*

Reactive Red 120 structure; National Center for Biotechnology Information; PubChem Compound Database; CID=6012481, https://pubchem.ncbi.nlm.nih.goc/compound/6012481; no date available; 18 pages.*

Matyjas et al.; "Novel Reactive Red Dyes"; AUTEX Research Journal, vol. 3, No. 2, Jun. 2003; 6 pages.*

Sultana et al.; "Sensitivity Analysis of Vinyl Sulphone and Bis-Monochlorotriazine Reactive Groups of Reactive Dyes"; European Scientific Journal Jun. 2016 edition, vol. 12, No. 18, ISSN: 1857-7881; 10 pages.*

* cited by examiner

HIGH FIXATION INK COMPOSITION FOR DIGITAL TEXTILE PRINTING

CROSS REFERENCE TO RELATED APPLICATION

This application claims the benefits of the Taiwan Patent Application Serial Number 104114695, filed on May 8, 2015, the subject matter of which is incorporated herein by reference.

BACKGROUND OF THE INVENTION

1. Field of the Invention

The present invention relates to a novel high fixation ink composition for digital textile printing. More particularly, the ink composition comprises a reactive dye compound with two reactive groups.

2. Description of Related Art

Over the years, digital ink printing has received increasing attention. The current ink used for digital textile inkjet printing is formulated using a traditional dye comprising a single reactive group. However, there are disadvantages when such traditional dyes are used. For example, reactivity of dyes comprising a single reactive group to fabric is weak. Coloring by dyes comprising a single reactive group is uneven. Fixation rate of dyes comprising a single reactive group is poor. In general, the fixation rate of a printing ink formulated using a dye comprising a single reactive group is only 50% to 70%. With such a low fixation rate, 30% to 50% of unfixed dye is usually washed off. Subsequent treatment of colored wastewater is always required. However, treatment of colored wastewater is usually very complicated.

In addition, since the reactive groups of most reactive dyes are halogen group or nicotinic acid, these reactive dyes are prone to hydrolysis. As a result, the pH value of printing ink is usually low, causing the storage stability of printing ink to be poor. Therefore, the storage and expiration date of printing ink are usually affected.

Accordingly, there is a need to develop an ink composition with high pH stability, high fixation rate, and high coloring concentration for digital textile inkjet printing of fabrics.

SUMMARY OF THE INVENTION

The object of the present invention is to provide a novel high fixation ink composition for digital textile printing. Specifically, the ink composition comprises a dye compound with two reactive groups. Thus, the reactivity of the ink composition is high. The ink composition also has characteristics such as high pH stability, good storage stability, improved dye fixation rate, and less colored wastewater production. The ink composition is suitable for digital inkjet printing.

To achieve the aforesaid object, the present invention provides a high fixation ink composition for digital textile printing, comprising: (A) at least one reactive dye compound of the following formula (I) in an amount of 1% to 50% by weight; (B) an organic buffer in an amount of 0.05% to 10% by weight; (C) a humectant in an amount of 10% to 50% by weight; and (D) a solvent in remaining amount;

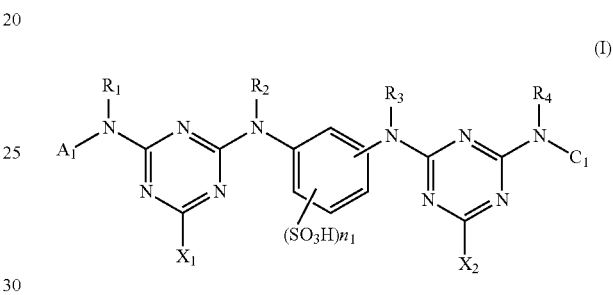

(I)

wherein $A_1$ is a dye chromophore; $X_1$ and $X_2$ are each independently a leaving group; $C_1$ is a benzene ring unsubstituted or substituted by a sulfonate group or a hydroxyl group; $R_1$, $R_2$, $R_3$, and $R_4$ are each independently hydrogen, unsubstituted or substituted $C_{1-6}$ alkyl; and $n_1$ is 1 or 2.

According to an embodiment of the present invention, in the reactive dye compound of the above formula (I), $A_1$ may be any known dye chromophores in the art with no particular limitation. For example, $A_1$ may be any dye chromophores of the following formulas (I-1) to (I-34) in Table 1. The color of each dye chromophore of the following formulas (I-1) to (I-34) is listed in Table 1 as well.

TABLE 1

| | Dye Chromophore | Color |
|---|---|---|
| (I-1) | | yellow |
| (I-2) | | red |

TABLE 1-continued

| | Dye Chromophore | Color |
|---|---|---|
| (I-3) | | red |
| (I-4) | | dark blue |
| (I-5) | | yellow |
| (I-6) | | yellow |
| (I-7) | | yellow |
| (I-8) | | red |
| (I-9) | | dark red |
| (I-10) | | yellow |

TABLE 1-continued
| | Dye Chromophore | Color |
|---|---|---|
| (I-11) | 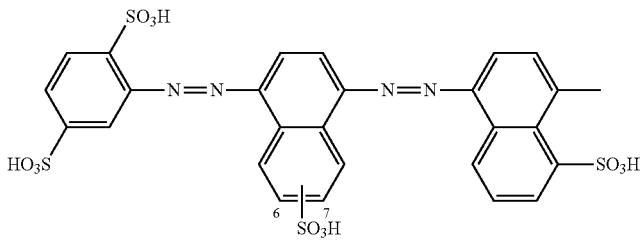 | brown |
| (I-12) | 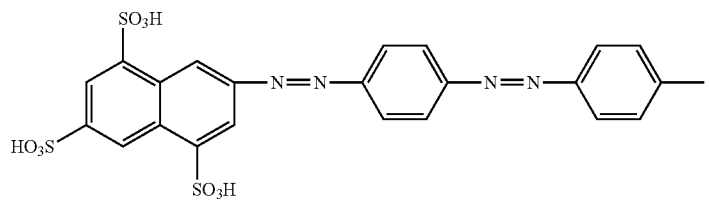 [SMILES: Cc1ccc(N=Nc2ccc(N=Nc3cc(S(=O)(=O)O)c4cc(S(=O)(=O)O)cc(S(=O)(=O)O)c4c3)cc2)cc1] | yellow |
| (I-13) | 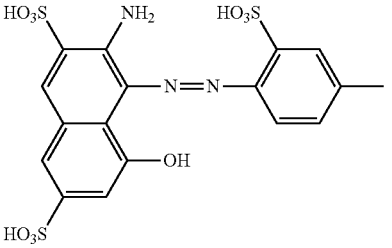 [SMILES: Cc1ccc(N=Nc2c(N)c(S(=O)(=O)O)cc3cc(S(=O)(=O)O)cc(O)c23)c(S(=O)(=O)O)c1] | red |
| (I-14) | 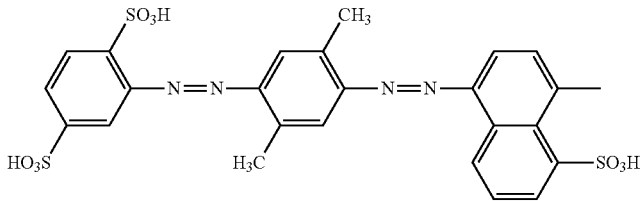 [SMILES: Cc1cc(N=Nc2ccc(C)c3c(S(=O)(=O)O)cccc23)c(C)cc1N=Nc1cc(S(=O)(=O)O)ccc1S(=O)(=O)O] | orange |
| (I-15) | 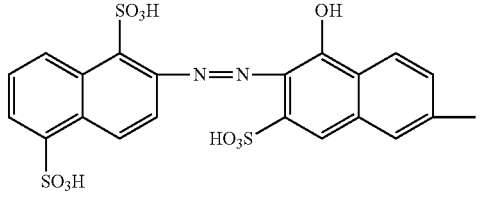 [SMILES: Cc1ccc2c(O)c(N=Nc3ccc4c(S(=O)(=O)O)cccc4c3S(=O)(=O)O)c(S(=O)(=O)O)cc2c1] | orange |
| (I-16) | 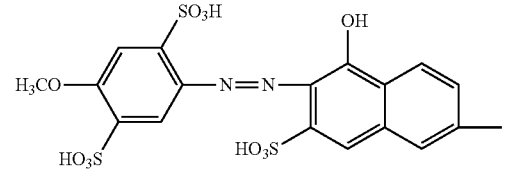 | dark red |
| (I-17) | 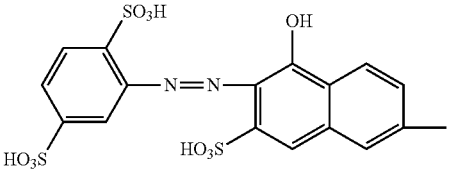 [SMILES: Cc1ccc2c(O)c(N=Nc3cc(S(=O)(=O)O)ccc3S(=O)(=O)O)c(S(=O)(=O)O)cc2c1] | orange |

TABLE 1-continued

| | Dye Chromophore | Color |
|---|---|---|
| (I-18) | | orange |
| (I-19) | | dark blue |
| (I-20) | | dark blue |
| (I-21) | | blue |
| (I-22) | | dark red |
| (I-23) | | dark red |
| (I-24) | | blue |
| (I-25) | | blue |

TABLE 1-continued
| Dye Chromophore | Color |
|---|---|
| (I-26) 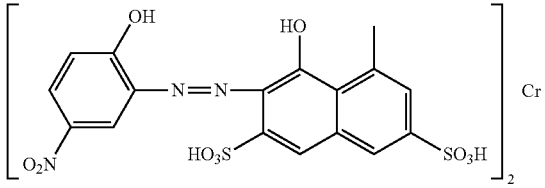 1:2 Cr complex | gray |
| (I-27) 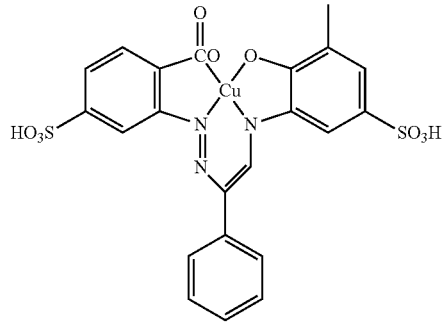 | blue |
| (I-28) 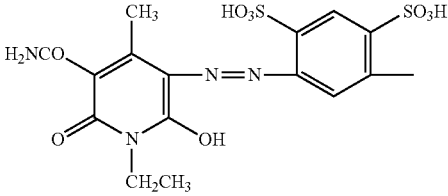 | yellow |
| (I-29) 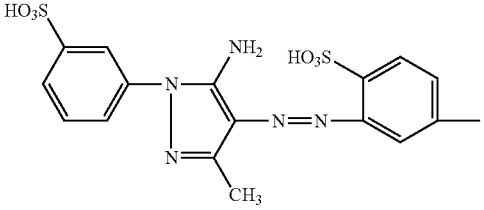 [SMILES: Cc1ccc(S(=O)(=O)O)c(N=Nc2c(C)nn(-c3cccc(S(=O)(=O)O)c3)c2N)c1] | yellow |
| (I-30) 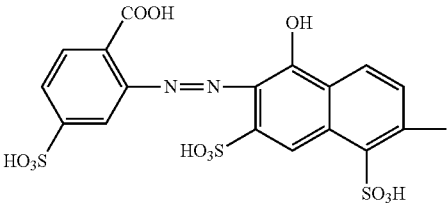 | orange |
| (I-31) 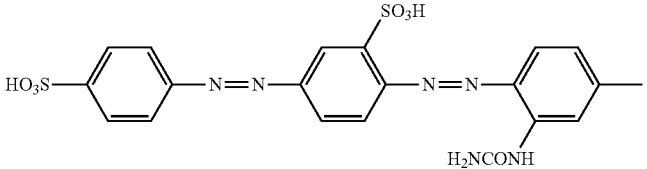 | yellow |
| (I-32) 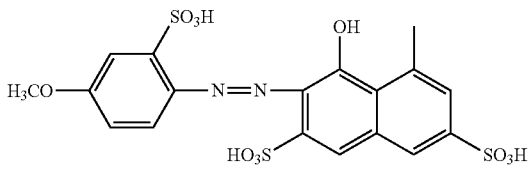 [SMILES: COc1ccc(N=Nc2c(S(=O)(=O)O)cc3cc(S(=O)(=O)O)cc(C)c3c2O)c(S(=O)(=O)O)c1] | red |

TABLE 1-continued

| Dye Chromophore | Color |
|---|---|
| (I-33) 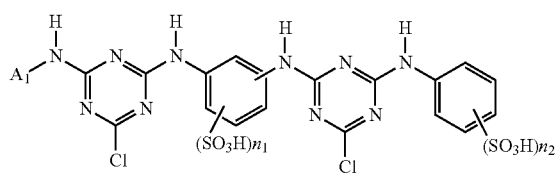 | red |
| (I-34) 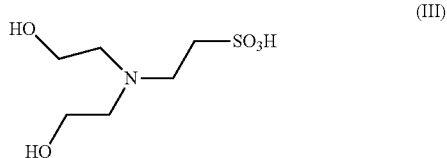 [SMILES: O=S(=O)(O)CCN(CCO)CCO] | dark blue |

According to a preferred embodiment of the present invention, in the reactive dye compound of the above formula (I), the dye chromophore $A_1$ is preferably one of the dye chromophores of the above formulas (I-1) to (I-5). $X_1$ and $X_2$ are preferably each independently halogen, or a nicotinic acid group.

According to an embodiment of the present invention, in the reactive dye compound of the above formula (I), $X_1$ and $X_2$ are preferably chlorine; $C_1$ is preferably a benzene ring substituted by a sulfonate group; $R_1$, $R_2$, $R_3$, and $R_4$ are preferably hydrogen. When $X_1$ and $X_2$ are chlorines, the reactive dye compound of the above formula (I) will have two monochloro triazine reactive groups.

According to another preferred embodiment of the present invention, the high fixation ink composition for digital textile printing comprises: (A) at least one reactive dye compound of the above formula (I) in a preferred amount of 3% to 45% by weight; (B) an organic buffer in a preferred amount of 0.1% to 8% by weight; (C) a humectant in a preferred amount of 10% to 35% by weight; and (D) a solvent in remaining amount.

According to another embodiment of the present invention, the reactive dye compound is of the following formula (II):

(II)

wherein $A_1$ is a dye chromophore; and $n_1$ and $n_2$ are each independently 1 or 2.

According to an embodiment of the present invention, in the reactive dye compound of the above formula (II), $A_1$ may be any known dye chromophores in the art with no particular limitation. For example, $A_1$ may be any dye chromophores of formulas (I-1) to (I-34) in Table 1. The color of each dye chromophore of formulas (I-1) to (I-34) is listed in Table 1. Preferably, the dye chromophore $A_1$ is one of the dye chromophores of formulas (I-1) to (I-5). In addition, in formula (II), $n_2$ is preferably 1.

In the high fixation ink composition for digital textile printing of the present invention, since the reactive dye compound of formula (I) or (II) comprises two halogen groups (i.e. chlorine) as the reactive groups, the pH value of the ink composition will decrease after hydrolysis. The organic buffer of the ink composition can stabilize the pH value of the ink composition. The organic buffer may be selected from the group consisting of 3-(N-morpholino) propanesulfonic acid (MOPS), N,N-diethylsulphanilic acid (DEAS), polyphosphate, N,N-bis(2-hydroxyethyl)-2-aminoethane sulfonic acid (BES) or a salt thereof, and a mixture thereof. The structure of BES is of the following formula (III):

(III)

In the high fixation ink composition for digital textile printing of the present invention, the humectant may be any humectants known in the art. For example, the humectant may be polyols, such as ethylene glycol, diethylene glycol, triethylene glycol, polyethylene glycol, tetraethylene glycol, 1,2-propanediol, polypropylene glycol, 1,3-propanediol, glycerol, and thioglycol; polyol ethers, such as ethylene glycol monoethyl ether, ethylene glycol monobutyl ether, diethylene glycol monobutyl ether, dipropylene glycol monoethyl ether, triethylene glycol monomethyl ether, diethylene glycol ether, and 1,2-hexanediol; ketones, such as acetone and methyl ethyl ketone; amides, such as caprolactam, N,N-diethyl-formamide, and N,N-dimethylacetamide; nitrogen-containing compounds, such as 2-pyridone, 2-pyrrolidone, N-methyl-2-pyrrolidone, N-vinyl-2-pyrrolidone, and 1,3-dimethyl-2-imidazolidinone; ethers, such as tetrahydrofuran and 1,4-dioxane; and alcohols, such as methanol, ethanol, 1-propanol, 2-propanol, 1-butanol, and 2-butanol. Preferably, the humectant may be 1,2-propanediol, diethylene glycol ether, 1,2-hexanediol, 2-pyrrolidone, or a mixture thereof.

In the high fixation ink composition for digital textile printing of the present invention, the solvent may be any solvents known in the art. Preferably, the solvent is water.

According to a preferred embodiment of the present invention, the high fixation ink composition for digital textile printing may further comprise a surfactant in an amount of 0.1% to 2% by weight. The surfactant used in the present invention may be any known surfactants in the art with no particular limitation. However, the surfactant is preferably an alkyne diol based surfactant, an alkoxy surfactant, or a non-ionic polymeric fluorochemical surfactant. Specific examples of the alkyne diol based surfactant include: Surfynol 485, Surfynol 465, Surfynol 440, Surfynol 420, and Surfynol 104 (commercially available from Air Products & Chemicals, Inc.). Specific examples of the alkoxy surfactant include: Tergitol 15-S-5, Tergitol 15-S-7, and Tergitol 15-S-9 (commercially available from Dow Chemical Company). Specific examples of the non-ionic polymeric fluorochemical surfactant include: FC-4430 (commercially available from 3M). However, the present invention is not limited hereto.

According to a preferred embodiment of the present invention, the high fixation ink composition for digital textile printing may further comprise a microbicide in an amount of 0.1% to 0.3% by weight. The microbicide used in the present invention may be any known microbicides in the art with no particular limitation. However, the microbicide is preferably NUOSEPT (commercially available from Nudex Inc., a division of Huls Americal), UCARCIDE (commercially available from Dow Chemical Company), VANCIDE (commercially available from RT Vanderbilt Co.), or PROXEL (commercially available from ICI Americas). The aforementioned additives are disclosed in TW 589352 or U.S. Pat. No. 5,725,641.

In the present invention, the high fixation ink composition for digital textile printing is preferably suitable for digital inkjet printing. The ink composition may be printed on common fiber materials. The fiber materials may be any materials known in the art. However, the fiber materials are preferably natural cellulose fibers and regenerated fibers thereof. For example, the fiber materials may be cotton, linen, rayon, silk, wool, and mixed fabrics thereof.

Accordingly, in the present invention, since the high fixation ink composition for digital textile printing provided comprises the aforesaid organic buffer, hydrolysis of the reactive groups of the reactive dye compound after storage can be reduced. Consequently, deterioration of color strength is reduced. Aside from having excellent color strength, the ink composition provided also has high storage stability, low precipitation rate, and good stabilities of printing and dyeing. Moreover, since the ink composition provided comprises a reactive dye compound with two reactive groups, the ink composition provided has high fiber-dye binding stability. Hence, when the ink composition provided is used in digital inkjet printing and dyeing, the printed fabrics obtained can have excellent overall properties such as in light fastness, wet fastness, moisture fastness, rubbing fastness, water fastness, chlorine-resistant fastness, and cross-dyeing fastness. Furthermore, since the ink composition provided has excellent reactivity, wastewater produced from digital inkjet printing can be reduced. Thereby, goals such as environmental protection and energy saving can then be accomplished.

Other objects, advantages, and novel features of the present invention will become more apparent from the following detailed description.

DETAILED DESCRIPTION OF THE PREFERRED EMBODIMENT

Although the present invention will be explained in relation to its preferred embodiments, it is to be understood that many other possible modifications and variations can be made without departing from the spirit and scope of the present invention as hereinafter claimed. The following examples are only intended to illustrate the present invention. The scope of the present invention should be defined by the claims appended hereto. The following examples should not be construed in any way to limit the scope of the present invention. Unless specified otherwise, units, such as part and percentage, used in the examples are calculated by weight and the temperature is represented by Celsius degrees (° C.).

Example 1

A yellow reactive printing ink of the present example is prepared by stir mixing 9 parts of a reactive dye compound of the following formula (i-1); 23 parts of a humectant (including 8 parts of 2-pyrrolidone and 15 parts of diethylene glycol ether); 1.5 parts of a non-ionic surfactant, Surfynol 465; 1 part of an organic buffer of the following formula (III); 0.2 parts of a microbicide, Proxel XII; and 65.3 parts of water at room temperature.

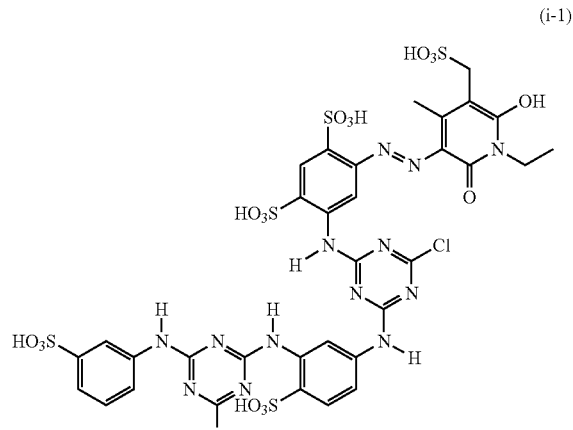

(i-1)

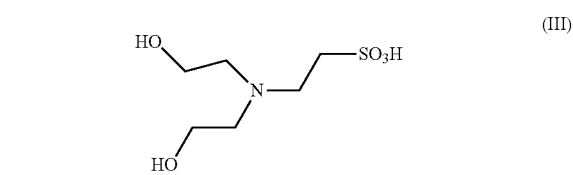

(III)

Comparative Example 1

The preparation method of a yellow reactive printing ink of the present comparative example is the same as that of Example 1 in general. The difference is that the reactive dye compound used in the present comparative example is of the following formula (i-2), which is a CI. Reactive Yellow 95.

(i-2)

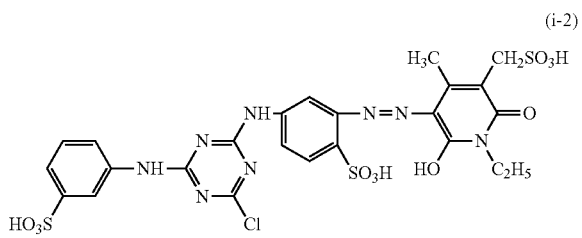

Test Example 1

In the present test example, the viscosity, pH value, UV/absorbance, and surface tension of the yellow reactive printing inks prepared in Example 1 and Comparative Example 1 are measured. The results of the measurements are shown in Table 2.

In addition, the fixation rate of the yellow reactive printing inks prepared in Example 1 and Comparative Example 1 are also evaluated in the present test example. The method of fixation rate measurement is as follows: Color blocks of the same size are first inkjet printed on two cotton cloths using the same nozzle of a desktop printer, Epson XP-202. After printing, the ink concentration of one of the two cotton cloths not being steamed is measured and designated as the original inkjet printing concentration (a). The other cotton cloth is steamed and washed after inkjet printing, which comprises the following steps: After the ink has been inkjet printed on the cotton cloth, the cotton cloth is dried for 10 mins and steamed for 10 mins. The cotton cloth and 500 g of water are then heated to boiling. After washing for 10 mins, the concentration (b) of the dye in the wash solution is then measured. The fixation rate is calculated by the following equation:

Fixation Rate (%)=coloring concentration of cotton cloth $(a-b)$/original inkjet printing concentration $(a) \times 100\%$.

The results are shown in Table 2.

TABLE 2

| | | Yellow Dye | |
| --- | --- | --- | --- |
| Reactive Printing Ink | | Example 1 | Comparative Example 1 |
| Ink Property | Viscosity (25°) (cP) | 3.42 | 3.24 |
| | pH Value | 7.53 | 7.59 |
| | UV/Absorbance | 324/422 nm | 323/422 nm |
| | Surface Tension (mN/m) | 31.65 | 32.32 |
| | Fixation Rate (%) | 81.7 | 60.5 |

Example 2-1

A red reactive printing ink of the present example is prepared by stir mixing 12 parts of a reactive dye compound of the following formula (ii-1); 11 parts of a humectant (including 3 parts of 1,2-propanediol, 7 parts of diethylene glycol ether, and 1 part of glycerol); 0.5 parts of a non-ionic surfactant, Surfynol 465; 1 part of an organic buffer of the above formula (III); 0.2 parts of a microbicide, Proxel XII; and 75.3 parts of water at room temperature, respectively.

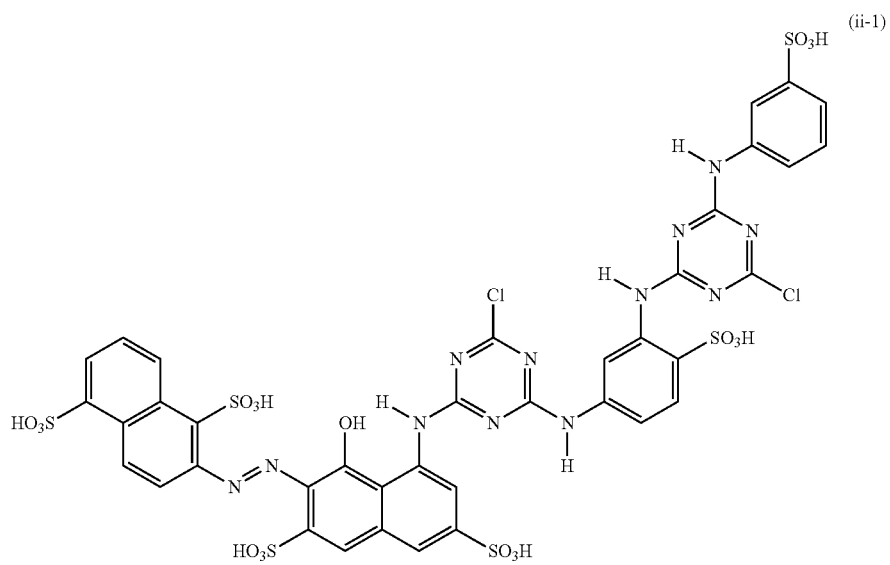 [SMILES: O=S(=O)(O)c1cccc(Nc2nc(Cl)nc(Nc3cc(Nc4nc(Cl)nc(Nc5cc(S(=O)(=O)O)cc6cc(S(=O)(=O)O)c(/N=N/c7ccc8c(S(=O)(=O)O)cccc8c7S(=O)(=O)O)c(O)c56)n4)ccc3S(=O)(=O)O)n2)c1]

(ii-1)

Example 2-2

A red reactive printing ink of the present example is prepared by stir mixing 11.9 parts of a reactive dye compound of the following formula (ii-2); 11 parts of a humectant (including 10 parts of diethylene glycol ether and 1 part of glycerol); 0.5 parts of a non-ionic surfactant, Surfynol 465; 1 part of an organic buffer of the above formula (III); 0.2 parts of a microbicide, Proxel XII; and 75.4 parts of water at room temperature, respectively.

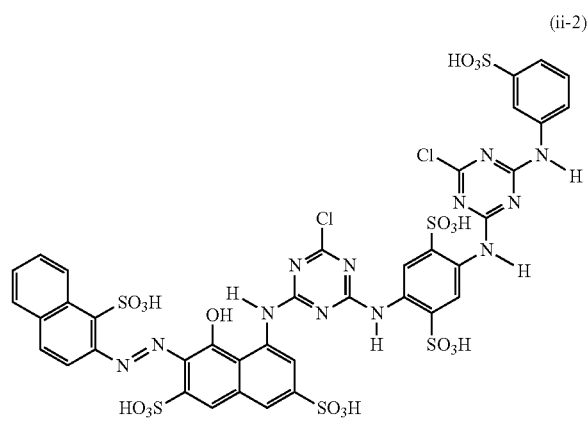 [SMILES: O=S(=O)(O)c1cccc(Nc2nc(Cl)nc(Nc3cc(S(=O)(=O)O)c(Nc4nc(Cl)nc(Nc5cc(S(=O)(=O)O)cc6cc(S(=O)(=O)O)c(/N=N/c7ccc8ccccc8c7S(=O)(=O)O)c(O)c56)n4)cc3S(=O)(=O)O)n2)c1]

(ii-2)

Comparative Example 2-1

A red reactive printing ink of the present comparative example is prepared by stir mixing 12 parts of a reactive dye compound, CI. Reactive Red 3:1, of the following formula (ii-3); 21 parts of a humectant (including 12 parts of 2-pyrrolidone, 8 parts of 1,2-propanediol, and 1 part of glycerol); 0.5 parts of a non-ionic surfactant, Surfynol 465; 1 part of an organic buffer of the above formula (III); 0.2 parts of a microbicide, Proxel XII; and 65.3 parts of water at room temperature, respectively.

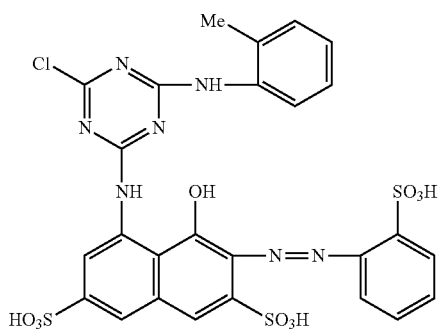

(ii-3)

Comparative Example 2-2

A red reactive printing ink of the present comparative example is prepared by stir mixing 10.9 parts of a reactive dye compound, CI. Reactive Red 245, of the following formula (ii-4); 24 parts of a humectant (including 12 parts of diethylene glycol ether, 11 parts of 1,2-propanediol, and 1 part of glycerol); 0.5 parts of a non-ionic surfactant, Surfynol 465; 1 part of an organic buffer of the above formula (III); 0.2 parts of a microbicide, Proxel XII; and 63.4 parts of water at room temperature, respectively.

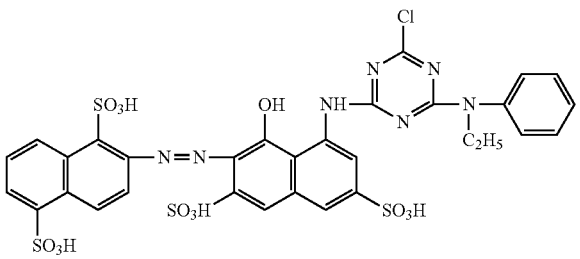

(ii-4)

Test Example 2

In the present test example, the viscosity, pH value, UV/absorbance, surface tension, and fixation rate of the red reactive printing inks prepared in Example 2-1, Example 2-2, Comparative Example 2-1, and Comparative Example 2-2 are measured. The results of the measurements are shown in Table 3. The method of fixation rate measurement of Test Example 2 is the same as that of Test Example 1.

TABLE 3

| | | Red Dye | | | |
|---|---|---|---|---|---|
| Reactive Printing Ink | | Example 2-1 | Example 2-2 | Comparative Example 2-1 | Comparative Example 2-2 |
| Ink Property | Viscosity (25°) (cP) | 3.74 | 4.03 | 3.78 | 3.75 |
| | pH Value | 7.45 | 7.71 | 7.51 | 7.44 |
| | UV/Absorbance | 439/546 nm | 433/547 nm | 437/534 nm | 441/543 nm 422/518 nm |
| | Surface Tension (mN/m) | 31.23 | 32.23 | — | 34.56 |
| | Fixation Rate (%) | 85.8 | 86.5 | 68.5 | 63.3 |

Example 3

A blue reactive printing ink of the present example is prepared by stir mixing 6.5 parts of a reactive dye compound of the following formula (iii-1); 32 parts of a humectant (including 15 parts of 1,2-propanediol, 15 parts of 2-pyrrolidone, and 1 part of 1,2 hexanediol); 1 part of a non-ionic surfactant, Surfynol 465; 1 part of an organic buffer of the above formula (III); 0.2 parts of a microbicide, Proxel XII; and 59.3 parts of water at room temperature, respectively.

TABLE 4

| | | Blue Dye | |
| --- | --- | --- | --- |
| Reactive Printing Ink | | Example 3 | Comparative Example 3 |
| Ink Property | Viscosity (25°) (cP) | 3.9 | 3.79 |
| | pH Value | 7.73 | 7.46 |
| | UV/Absorbance | 197/614 nm | 185/611 nm |

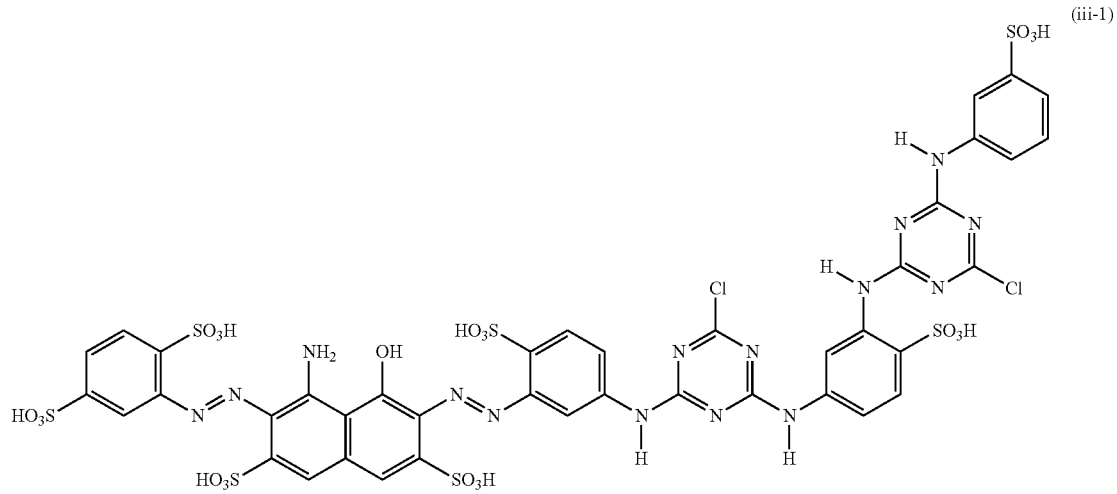 [SMILES: Nc1c(/N=N/c2cc(S(=O)(=O)O)ccc2S(=O)(=O)O)c(S(=O)(=O)O)cc2cc(S(=O)(=O)O)c(/N=N/c3cc(Nc4nc(Cl)nc(Nc5ccc(S(=O)(=O)O)c(Nc6nc(Cl)nc(Nc7cccc(S(=O)(=O)O)c7)n6)c5)n4)ccc3S(=O)(=O)O)c(O)c12]

(iii-1)

Comparative Example 3

A blue reactive printing ink of the present comparative example is prepared by stir mixing 4 parts of a reactive dye compound, CI. Reactive Blue 176, of the following formula (iii-2); 36 parts of a humectant (including 16 parts of 1,2-propanediol, 18 parts of 2-pyrrolidone, and 2 parts of 1,2 hexanediol); 1 part of a non-ionic surfactant, Surfynol 465; 1 part of an organic buffer of the above formula (III); 0.2 parts of a microbicide, Proxel XII; and 57.8 parts of water at room temperature, respectively.

TABLE 4-continued

| | Blue Dye | |
| --- | --- | --- |
| Reactive Printing Ink | Example 3 | Comparative Example 3 |
| Surface Tension (mN/m) | 32.65 | 32.87 |
| Fixation Rate (%) | 88.3 | 71.5 |

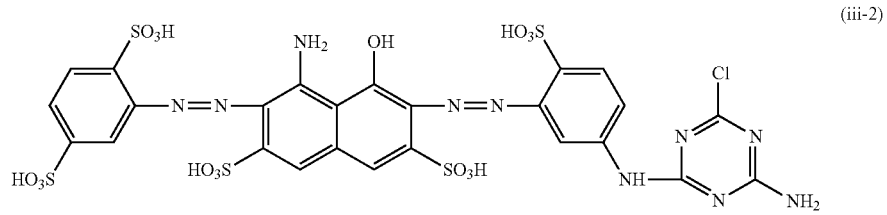 [SMILES: Nc1nc(Cl)nc(Nc2ccc(S(=O)(=O)O)c(N=Nc3c(S(=O)(=O)O)cc4cc(S(=O)(=O)O)c(N=Nc5cc(S(=O)(=O)O)ccc5S(=O)(=O)O)c(N)c4c3O)c2)n1]

(iii-2)

Test Example 3

In the present test example, the viscosity, pH value, UV/absorbance, surface tension, and fixation rate of the blue reactive printing inks prepared in Example 3 and Comparative Example 3 are measured. The results of the measurements are shown in Table 4. The method of fixation rate measurement of Test Example 3 is the same as that of Test Example 1.

Example 4

A golden yellow reactive printing ink of the present example is prepared by stir mixing 8.9 parts of a reactive dye compound of the following formula (iv-1); 18 parts of a humectant (including 8 parts of 2-pyrrolidone and 10 parts of diethylene glycol ether); 1 part of a non-ionic surfactant, Surfynol 465; 0.1 parts of a non-ionic surfactant, Tergitol 15-S-5; 1 part of an organic buffer of the above formula (III); 0.2 parts of a microbicide, Proxel XII; and 70.8 parts of water at room temperature, respectively.

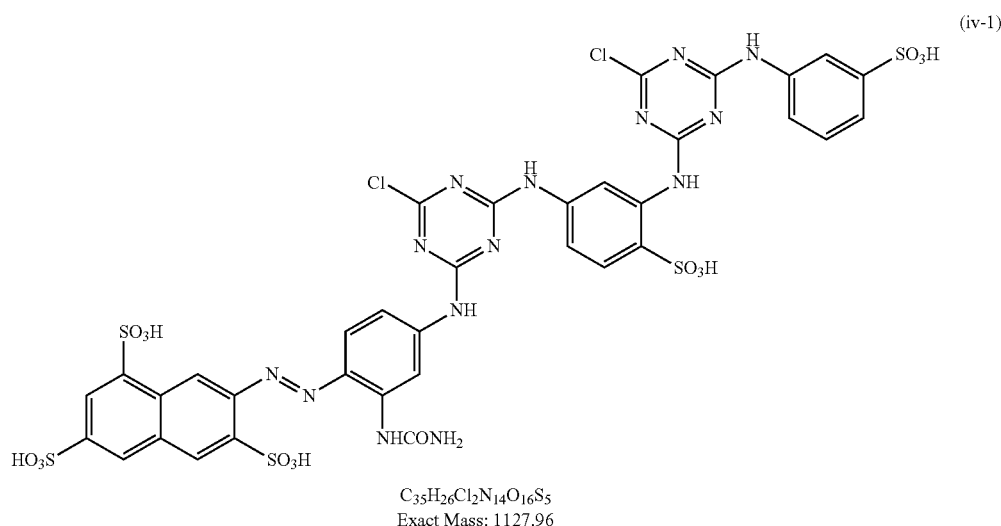

(iv-1)

$C_{35}H_{26}Cl_2N_{14}O_{16}S_5$
Exact Mass: 1127.96

Comparative Example 4

An orange reactive printing ink of the present comparative example is prepared by stir mixing 12.9 parts of a reactive dye compound, C.I. Reactive Orange 12, of the following formula (iv-2); 23 parts of a humectant (including 8 parts of 2-pyrrolidone and 15 parts of diethylene glycol ether); 1 part of a non-ionic surfactant, Surfynol 465; 0.1 parts of a non-ionic surfactant, Tergitol 15-S-5; 1 part of an organic buffer of the above formula (III); 0.2 parts of a microbicide, Proxel XII; and 65.7 parts of water at room temperature, respectively.

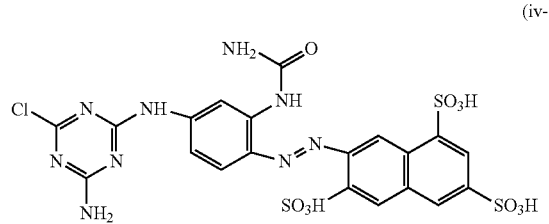

(iv-2)

Test Example 4

In the present test example, the viscosity, pH value, UV/absorbance, surface tension, and fixation rate of the reactive printing inks prepared in Example 4 and Comparative Example 4 are measured. The results of the measurements are shown in Table 5. The method of fixation rate measurement of Test Example 4 is the same as that of Test Example 1.

TABLE 5

| Reactive Printing Ink | | Golden Yellow Dye Example 4 | Orange Dye Comparative Example 4 |
|---|---|---|---|
| Ink Property | Viscosity (25°) (cP) | 3.9 | 3.12 |
| | pH Value | 7.38 | 7.26 |
| | UV/Absorbance | 320/435 nm | 316/420 nm |

TABLE 5-continued

| Reactive Printing Ink | Golden Yellow Dye Example 4 | Orange Dye Comparative Example 4 |
|---|---|---|
| Surface Tension (mN/m) | 29.3 | 30.26 |
| Fixation Rate (%) | 84.8 | 66.4 |

Accordingly, as shown by the results of the measurements of the aforesaid examples and comparative examples, it is obvious that the high fixation ink compositions for digital textile printing provided by the present invention (each comprises a reactive dye compound with two reactive groups) can react and bond to fabrics very easily. Thus, the fixation rates of the ink compositions provided by the present invention have been increased to more than 80%. The ink compositions provided by the present invention are significantly better than the reactive dye compounds with only one reactive group of the aforesaid comparative examples. Hence, the ink composition provided by the present invention will produce less colored wastewater after printing and dyeing. The cost of printing and dyeing can then be reduced. The ink composition provided by the present invention is environmental friendly and energy saving.

What is claimed is:

1. A high fixation ink composition for digital textile printing, comprising:
   (A) at least one reactive dye compound of the following formula (II) in an amount of 1% to 50% by weight;
   (B) an organic buffer or a polyphosphate buffer in an amount of 0.05% to 10% by weight;
   (C) a humectant in an amount of 10% to 50% by weight; and
   (D) a solvent in remaining amount;

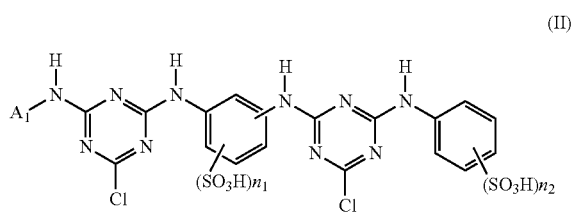
(II)
wherein $A_1$ is a dye chromophore; and $n_1$ and $n_2$ are each independently 1 or 2;
wherein the dye chromophore is selected from the group consisting of dye chromophores of the following formulas (I-1) to (I-34):
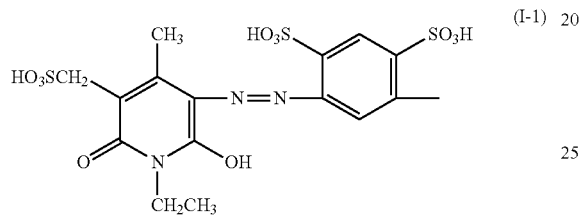
(I-1)
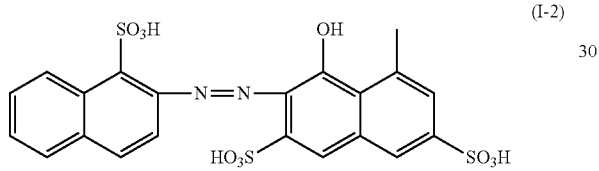
(I-2)
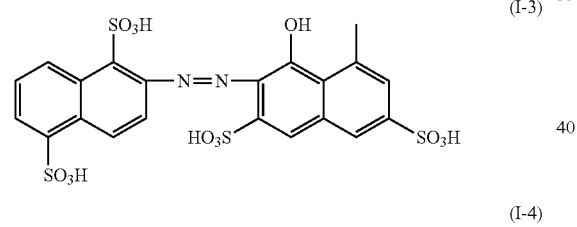
(I-3)
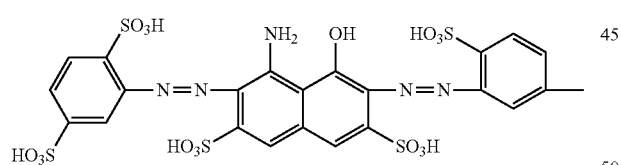
(I-4)
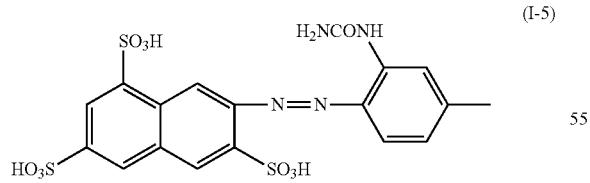
(I-5)
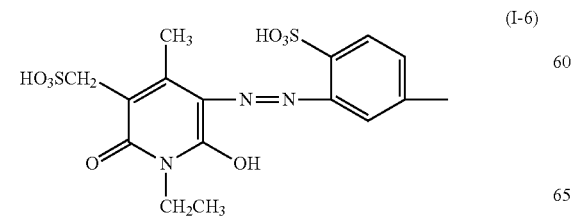
(I-6)
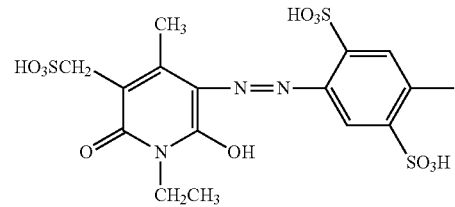
(I-7)
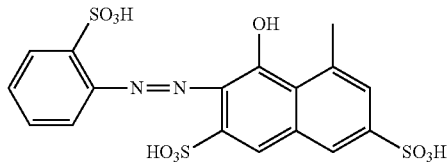
(I-8)
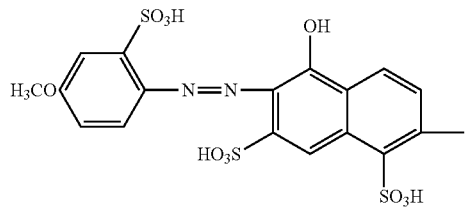
(I-9)
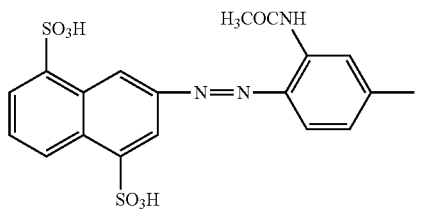
(I-10)
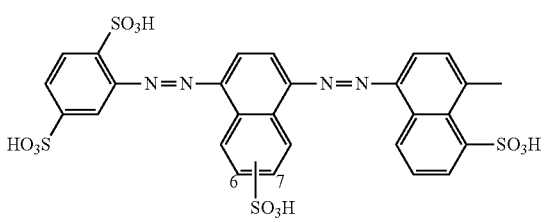
(I-11)
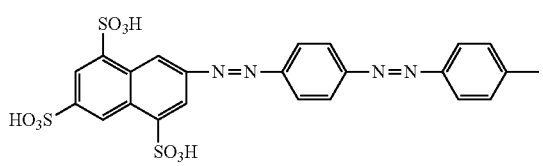
(I-12)
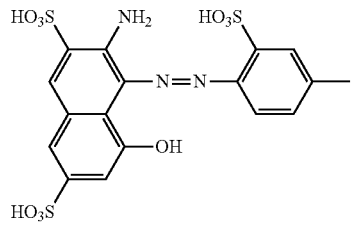
(I-13)

(I-14)
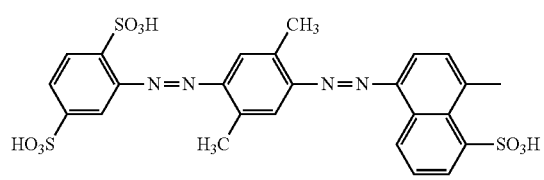
(I-15)
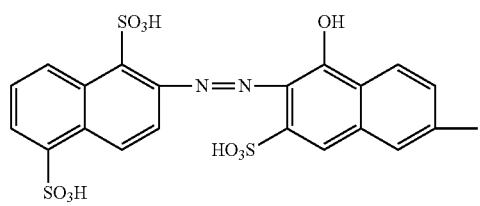
(I-16)
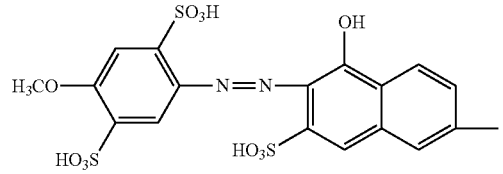
(I-17)
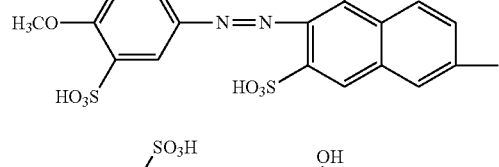
(I-18)
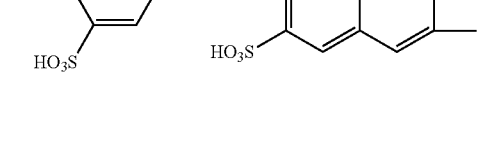
(I-19)
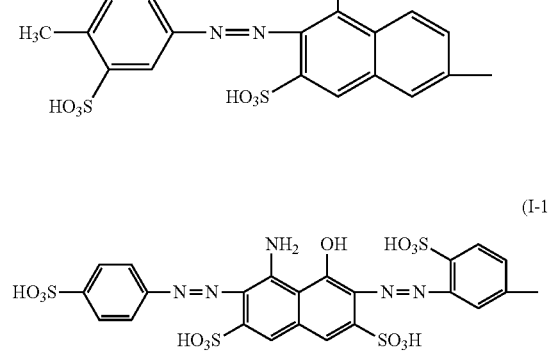
(I-20)
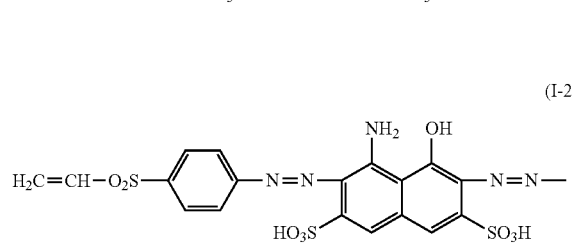
(I-21)
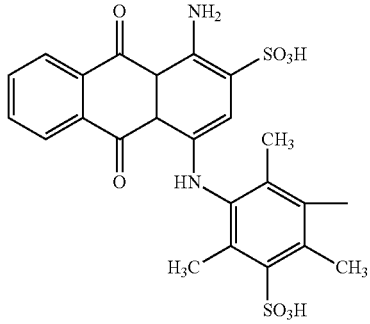
(I-22)
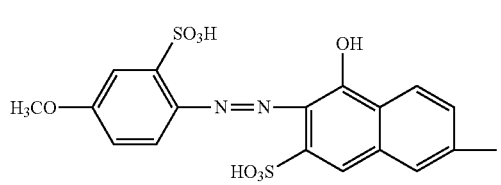
(I-23)
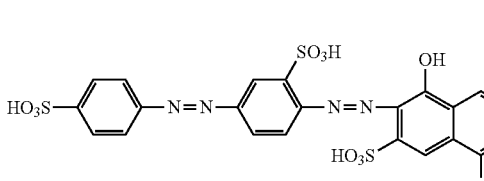
(I-24)
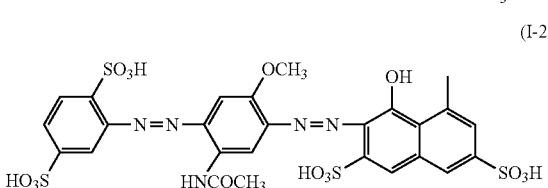
(I-25)
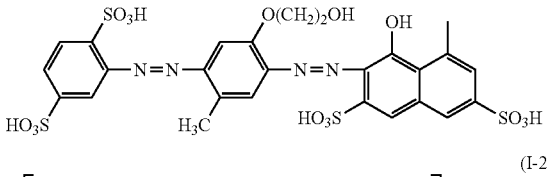
(I-26)
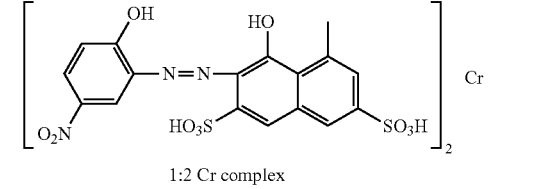
1:2 Cr complex
(I-27)
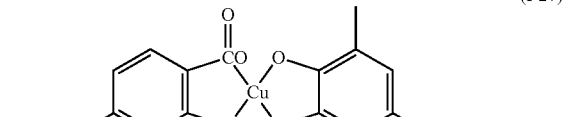

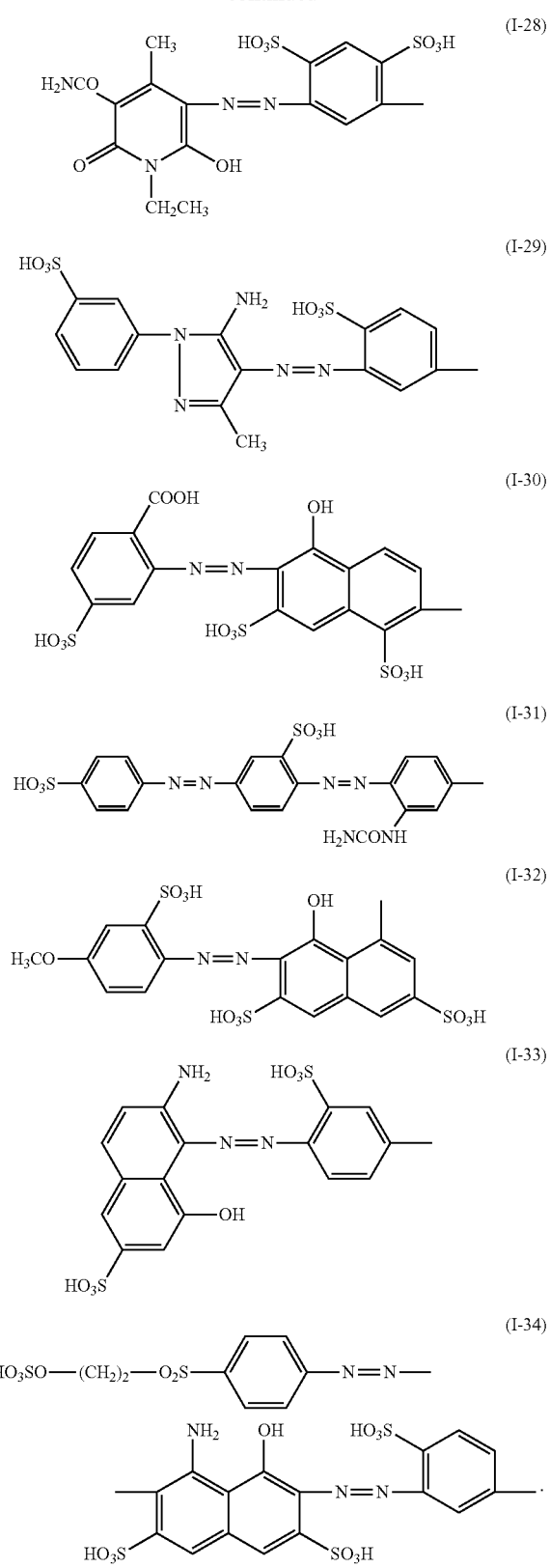

2. The ink composition as claimed in claim 1, wherein the dye chromophore is selected from the group consisting of dye chromophores of the following formulas (I-1) to (I-5):

3. The ink composition as claimed in claim 1, wherein the organic buffer is selected from the group consisting of 3-(N-morpholino)propanesulfonic acid (MOPS), N,N-diethylsulphanilic acid (DEAS), N,N-bis(2-hydroxyethyl)-2-aminoethanesulfonic acid (BES) or a salt thereof, and a mixture thereof.

4. The ink composition as claimed in claim 1, wherein the humectant is selected from the group consisting of ethylene glycol, diethylene glycol, triethylene glycol, polyethylene glycol, tetraethylene glycol, 1,2-propanediol, polypropylene glycol, 1,3-propanediol, glycerol, thioglycol, ethylene glycol monoethyl ether, ethylene glycol monobutyl ether, diethylene glycol monobutyl ether, dipropylene glycol monoethyl ether, triethylene glycol monomethyl ether, diethylene glycol ether, 1,2-hexanediol, acetone, methyl ethyl ketone, caprolactam, N,N-diethyl-formamide, N,N-dimethylacetamide, 2-pyridone, 2-pyrrolidone, N-methyl-2-pyrrolidone, N-vinyl-2-pyrrolidone, 1,3-dimethyl-2-imidazolidinone, tetrahydrofuran, 1,4-dioxane, methanol, ethanol, 1-propanol, 2-propanol, 1-butanol, 2-butanol, and a mixture thereof.

5. The ink composition as claimed in claim 1, wherein the solvent is water.

6. The ink composition as claimed in claim 1, further comprising a surfactant in an amount of 0.1% to 2% by weight, wherein the surfactant is an alkynediol based surfactant, an alkoxyl based surfactant, or a non-ionic polymeric fluorochemical surfactant.

7. The ink composition as claimed in claim 1, further comprising a microbicide in an amount of 0.1% to 0.3% by weight.

\* \* \* \* \*